(12) United States Patent
Michel et al.

(10) Patent No.: US 8,531,668 B2
(45) Date of Patent: Sep. 10, 2013

(54) METHOD FOR THE BINNING OF RADIATION-EMITTING, OPTOELECTRONIC SEMICONDUCTOR COMPONENTS

(75) Inventors: Felix Michel, Munich (DE); Julius Muschaweck, Gauting (DE); Merten Niebelschuetz, Neutraubling (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 390 days.

(21) Appl. No.: 12/959,343

(22) Filed: Dec. 2, 2010

(65) Prior Publication Data

US 2011/0157589 A1    Jun. 30, 2011

Related U.S. Application Data

(60) Provisional application No. 61/283,328, filed on Dec. 2, 2009.

(51) Int. Cl.
*G01J 3/46* (2006.01)
(52) U.S. Cl.
USPC ............................................. 356/402
(58) Field of Classification Search
USPC .............................. 356/402; 257/88
See application file for complete search history.

(56) References Cited

U.S. PATENT DOCUMENTS

| 4,878,072 | A | * | 10/1989 | Reinten | 347/236 |
| 6,900,471 | B1 | | 5/2005 | Wicke et al. | |
| 2008/0297028 | A1 | | 12/2008 | Kane et al. | |
| 2008/0297054 | A1 | | 12/2008 | Speier | |
| 2010/0140633 | A1 | * | 6/2010 | Emerson | 257/88 |

FOREIGN PATENT DOCUMENTS

| EP | 1 462 711 | 9/2004 |
| WO | WO 2009/014219 | 1/2009 |

OTHER PUBLICATIONS

ANSI: "Specifications for the Chromaticity of Solid State Lighting Products"—American National Standard Lighting Group; Sep. 1, 2008; pp. 1-17.
Cree, Inc.: "Binning and Labeling"—Cree Xlamp XR-E and XR-C LED; www.cree.com/xlamp; 2007-2008; pp. 1-14.

* cited by examiner

*Primary Examiner* — Kara E Geisel
(74) *Attorney, Agent, or Firm* — Cozen O'Connor (57) ABSTRACT

A method for the binning of a radiation-emitting, optoelectronic semiconductor component (20) is specified, comprising the following steps: providing a radiation-emitting, optoelectronic semiconductor component (20), determining the color locus (8) of the light emitted by the radiation-emitting, optoelectronic semiconductor component (20) during operation, classifying the radiation-emitting, optoelectronic semiconductor component (20) into a predefined color locus range (6) comprising the color locus determined.

17 Claims, 7 Drawing Sheets

METHOD FOR THE BINNING OF RADIATION-EMITTING, OPTOELECTRONIC SEMICONDUCTOR COMPONENTS

RELATED APPLICATIONS

This application claims priority from U.S. Provisional Patent Application Ser. No. 61/283,328 which was filed on Dec. 2, 2009, the entire content of which is hereby incorporated by reference.

FIELD OF THE INVENTION

A method for the binning of radiation-emitting, optoelectronic semiconductor components is specified. The radiation-emitting, optoelectronic semiconductor component can be, for example, a luminescence diode, that is to say a laser diode or a light-emitting diode.

BACKGROUND OF THE INVENTION

Light colors precisely defined by standards are predefined in many areas of use of radiation-emitting, optoelectronic semiconductor components. Owing to the production process, in the case of radiation-emitting, optoelectronic semiconductor components of one type and from one manufacturer, color differences can be conspicuous in a direct comparison. Therefore, it is often necessary to classify the radiation-emitting, optoelectronic semiconductor components into mutually gradated bins, that is to say to perform binning.

Numerous standardized systems for binning already exist.

The document U.S. Pat. No. 6,900,471 B1 describes a method for binning, where a blue color locus and/or a color locus to which no correlated color temperature can be assigned are not accessible for binning.

One known system for binning is ANSI binning, for example. One advantage of this binning system is that a standardized binning system is involved. Furthermore, the bins of this classification system are coordinated with the Planck curve (also known as Planckian locus or black-body curve) and also the isothermal Judd lines of identical correlated color temperature. What can be established as negative is that the bins are centered neither with respect to the Judd lines nor with respect to the Planck curve over the entire range of the color temperature. Furthermore, the size of the individual bins is too large for standard LED applications. Subdivision of the bins into sub-bins of identical size for finer binning is not possible. Finally, the ANSI binning system does not cover the entire color locus range, not even the entire color locus range in which a correlated color temperature can be assigned.

SUMMARY OF THE INVENTION

One object of the invention is to provide a binning method with which a large number of different radiation-emitting, optoelectronic semiconductor components can be classified consistently into bins.

In accordance with at least one embodiment of the binning method, firstly a radiation-emitting, optoelectronic semiconductor component is provided. The semiconductor component is, for example, a laser diode, a laser diode chip, a light-emitting diode or a light-emitting diode chip.

In a subsequent method step, the color locus of the light emitted by the radiation-emitting, optoelectronic semiconductor component during operation is determined. By way of example, a spectral photometer is used for determining the color locus.

In this case, the color locus can be determined on the basis of any desired color space. In principle, any color space is suitable for describing a color unambiguously by means of its color locus. In order to achieve comparability and reproducibility, however, the color locus is preferably determined in a standardized color space. By way of example, the color locus can be determined in one of the CIE (International Commission on Illumination) color space systems or in a DIN (German Institute for Standardization) color space system.

A subsequent method step involves classifying the radiation-emitting, optoelectronic semiconductor component in a predefined color locus range, that is to say a bin, which comprises the color locus determined.

For this purpose, the color space system used is subdivided into groups of color locus ranges. The predefined color locus ranges are therefore the bins into which the radiation-emitting, optoelectronic semiconductor component can be classified. The classification is effected, for example, by comparison of the color locus determined with the color space subdivided into the predefined color locus ranges and assignment of the radiation-emitting, optoelectronic semiconductor component to the predefined color locus range in which the determined color locus of the radiation-emitting, optoelectronic semiconductor component is present.

In accordance with at least one embodiment of the binning method, in this case the predefined color locus range is selected from a group of color locus ranges, wherein at least one of the color locus ranges from the group of color locus ranges comprises a blue color locus. That is to say that the predefined color locus ranges—that is to say the bins available for classification—comprise at least one color locus range with a blue color locus to which no correlated color temperature can be assigned.

Color locus ranges with a blue color locus are not accessible in the conventional binning systems described above since said systems only comprise color locus ranges to which a correlated color temperature can be assigned. That is to say that the classification of the radiation-emitting, optoelectronic semiconductor components in said binning systems ends at the high-temperature end point of the Planck curve, that is to say in the bluish-white color locus.

Preferably, the predefined color locus range is selected from a group of color locus ranges which span the entire or substantially the entire color space. That is to say that the entire color space used or substantially the entire color space used can be assembled with the predefined color locus ranges from the group of color locus ranges, such that each color locus can also be assigned to a predefined color locus range. In this way, it is possible for completely different semiconductor components—for example colored, such as, for instance, red, green, blue or yellow light-emitting diodes, but also white light-emitting diodes—to be classified consistently into bins. "Substantially" the entire color space means that small regions of the color space—for example in the magenta-colored region of the color space—are possibly not accessible.

In accordance with at least one embodiment of the method, at least one of the predefined color locus ranges from the group of color locus ranges, that is to say one of the possible bins into which a classification can take place, is intersected by an extended Planck curve or directly adjoins the extended Planck curve. The extended Planck curve continues the Planck curve at its high-temperature end point. That is to say that the Planck curve that ends at the high-temperature end point, at which the color temperature tends toward infinity, is continued at this point into the range of blue color loci.

In other words, a composite curve composed of the extended Planck curve and the Planck curve passes through the color space used. At least one, preferably some of the color locus ranges from the group of color locus ranges then adjoins the composite curve or is intersected by the composite curve. In this case, the composite curve subdivides the color space used preferably into two separate regions: a region above the curve and a region below the curve. For this purpose, the composite curve extends from one edge of the color space to an opposite edge of the color space. In other words, unlike the Planck curve, the composite curve does not end in the middle of the color space.

Preferably, the Planck curve is continued by the extended Planck curve at its high-temperature end point in an at least once continuously differentiable manner, that is to say smoothly. In other words, the composite curve is at least once continuously differentiable at the high-temperature end point of the Planck curve.

It is also possible for the composite curve to be twice or multiply continuously differentiable at this point.

If the composite curve is at least twice continuously differentiable, for example, at the high-temperature end point, then the size of the predefined color locus ranges is particularly uniform, even if the color locus ranges are far away from the composite curve. In other words, as considered over the entire color space, the size of the color locus ranges does not jump or hardly jumps.

In this case, the method described here is based on the insight, inter alia, that the high-temperature end point (the correlated color temperature tends toward infinity) is that point which, for physically based reasons, separates a color space into two regions: color loci with a correlated color temperature and color loci without a correlated color temperature. The extension or lengthening of the Planck curve in the direction of blue color loci now also enables a subdivision of regions of the color space that are not accessible to conventional binning systems.

In accordance with at least one embodiment of the method, the extended Planck curve, in the CIE u'v' color space, is an at least quadratic spline. In other words, the extended Planck curve, in the CIE u'v' color space, is a quadratic spline or a higher-order spline. A quadratic spline proves to be particularly suitable for extending the Planck curve. In particular, from a mathematical, physical and technical point of view a quadratic Bézier spline can prove to be the simplest and clearest possibility for extending the Planck curve into the range of blue color loci. In color spaces other than the CIE u'v' color space, the transformation of the extended Planck curve can then be described by a function other than a spline. However, an inverse transformation into the CIE u'v' color space produces the original spline again.

Three points are required for the construction of, in particular, the quadratic spline.

In accordance with at least one embodiment of the method, the high-temperature end point Tu of the Planck curve is chosen as one point for the construction of the spline. In this way, the Planck curve is continued continuously at the high-temperature end point.

In accordance with at least one embodiment of the method, a point on the tangent to the Planck curve at the high-temperature end point is chosen as one point P for the construction of the spline. This enables the composite curve to be continuously differentiable at the high-temperature end point.

By way of example, the point of intersection of the tangent to the Planck curve at the high-temperature end point with the spectral color line can be chosen. The spectral color line is the line of spectrally pure colors which delimits a color space—for example the horseshoe-shaped CIE color space. The lower end of the color space is then enclosed by the purple line.

In accordance with at least one embodiment of the method, a point on the spectral color line is chosen as one point S for the construction of the spline. A point having a wavelength of at least 360 nm and at most 410 nm, for example the 380 nm point on the spectral color line, proves to be expedient for this purpose. The 380 nm point, for example, is distinguished by the fact that it specifies the spectral color having the lowest wavelength which can still be perceived by the human eye.

The quadratic spline is preferably constructed on the basis of the three points specified.

The spline, in the CIE u'v' color space, can be given as follows, for example:

$$\text{spline}(t) = Tu^*(1-t)^2 + P^*t^*(1-t) + S^*t^2,$$

t being chosen from [0;1];

The extended Planck curve thus has the value Tu at the origin, t=0, and the value S at its end point, t=1.

The position of the points in the color space, that is to say the color locus and the coordinates of the points in the color space, are dependent on the choice of color space system. However, the points can be specified unambiguously in every color space system, such that the method for the binning of radiation-emitting, optoelectronic semiconductor components that is described here is independent of color space. The subdivision into color locus ranges is then only dependent on the Planck curve and its continuation into the range of blue color loci, said continuation being physically accounted for by the construction points specified.

In accordance with at least one embodiment of the method, each color locus range from the group of color locus ranges is assigned an address. In this case, the address has a first parameter, which indicates the path length or the distance of the color locus range along the composite curve from the high-temperature end point of the Planck curve. In other words, the first parameter is measured along the composite curve. In this case, the actual length of the corresponding region of the composite curve is determined.

The address furthermore has a second parameter, which indicates the path length or the distance of the color locus range from the composite curve along a Judd line. In this case, the construction of the Judd lines is continued with the same construction stipulation as for the Planck curve and for the extended Planck curve. By way of example, with the use of the CIE 1960 (uv) color space, these lines are perpendicular to the composite curve, that is to say both to the Planck curve and to the extended Planck curve. Proceeding from and along the composite curve and also along the Judd lines, the entire color space can be opened up and addressed.

On account of the fact that the binning is only based on the composite curve composed of Planck curve and extended Planck curve, the binning method can be transformed to all known and possible color space systems and can therefore also be adapted to possible innovations for example on the part of the CIE and other standardization committees.

In accordance with at least one embodiment of the method, the size of each color locus range from the group of color locus ranges is chosen in such a way that an observer perceives no difference for colors from the same color locus range.

In other words, the subdivision into individual color locus ranges is performed in such a way that color loci which bring about the same color perception for an observer lie in the same color locus range.

In this case, the size of each color locus range is preferably chosen such that it corresponds at most to the extent of a three-step MacAdam ellipse. Particularly preferably, the size of each color locus range from the group of color locus ranges corresponds approximately or at most to a 1-step MacAdam ellipse.

This can be achieved, for example, by virtue of the fact that the extent of each color locus range from the group of color locus ranges along the composite curve is at least 0.001 and at most 0.005 in the CIE u'v' color space. Furthermore, the extent of each color locus range from the group of color locus ranges along the Judd lines is then at least 0.001 and at most 0.005 in the CIE u'v' color space. By way of example, the extent is chosen in both directions with 0.002 in the CIE u'v' color space.

These specifications can be transformed into other color spaces. The choice of the extent constitutes the sole free parameter in this case. In the present case, the parameter is chosen physically expediently to the effect that the color locus ranges spanned in this way from the group of color locus ranges have a size corresponding approximately to a 1-step MacAdam ellipse.

In accordance with at least one embodiment of the method, the information with respect to the predefined color locus range, that is to say the bin into which the radiation-emitting, optoelectronic semiconductor component is classified, can be stored in a storage unit, which, by way of example, is fixed and, if appropriate, electrically connected on a module carrier for the radiation-emitting, optoelectronic semiconductor component.

The module carrier can be, for example, a circuit board such as, for instance, a printed circuit board or a metal-core circuit board, on which the radiation-emitting, optoelectronic semiconductor component is also fixed and electrically connected.

BRIEF DESCRIPTION OF THE DRAWINGS

The method for the binning of radiation-emitting, optoelectronic semiconductor components as described here is explained in greater detail below on the basis of exemplary embodiments and the associated figures.

DETAILED DESCRIPTION OF THE DRAWINGS

With reference to FIGS. 1A, 1B, 2A, 2B, 2C, 3, the method described here is explained in greater detail.

Figure 4:
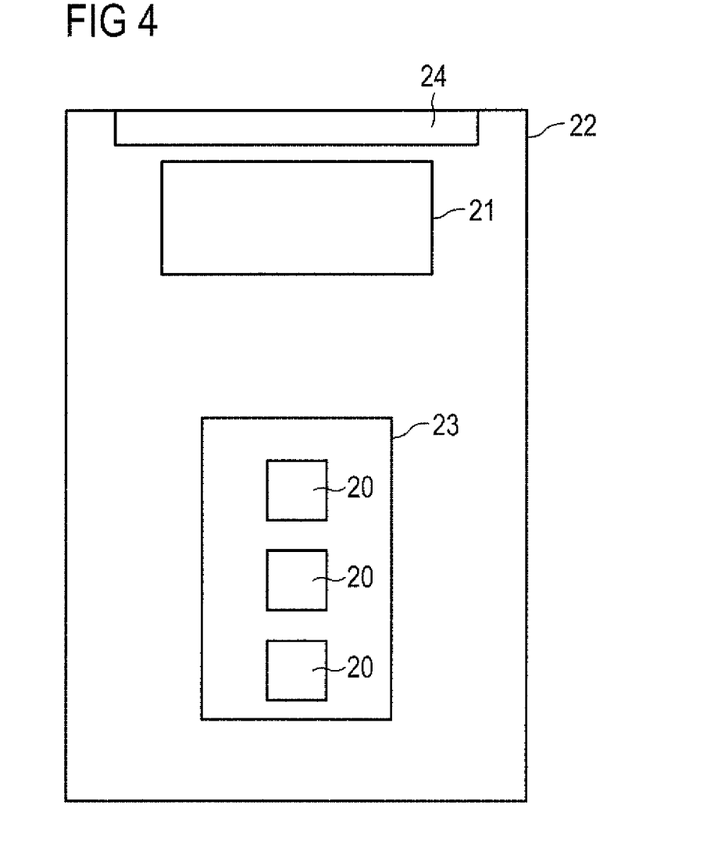
FIG. 4 shows a schematic diagram of an optoelectronic semiconductor device in accordance with an embodiment of the invention.

With reference to the schematic plan view in FIG. 4, an optoelectronic semiconductor device comprising radiation-emitting, optoelectronic semiconductor components classified by means of the method is explained in greater detail.

Elements which are identical, of identical type or act identically are provided with the same reference symbols in the figures. The figures and the size relationships of the elements illustrated in the figures among one another should not be regarded as true to scale. Rather, individual elements may be illustrated with exaggerated size in order to enable better illustration and/or in order to afford a better understanding.

Figure 1A:
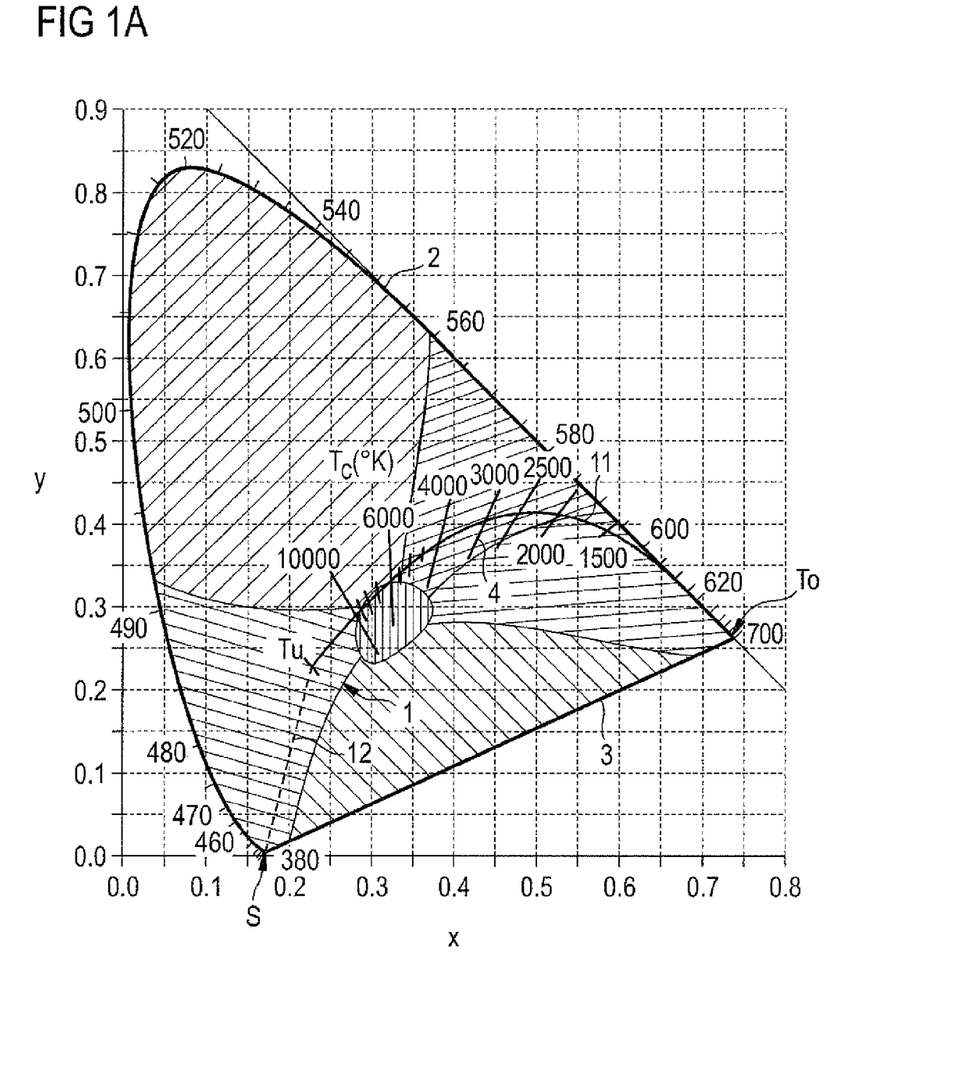
FIG. 1A shows a graphical plotting of the CIE-XY color space.

FIG. 1A shows a graphical plotting of the CIE-XY color space. The horseshoe-shaped color space is enclosed toward the top by the spectral color line 2 and terminated toward the bottom by the purple line 3. The Planck curve 11 has been drawn into the color space, said Planck curve being intersected by the Judd lines 4 (isotherms). The Planck curve 11 extends from the point T0 at a temperature of 0 K to the point Tu for a temperature that tends toward infinity. The Planck curve 11 ends in the bluish-white color locus range.

In the present case, the Planck curve 11 has been extended to form the composite curve 1.

For this purpose, the extended Planck curve 12 adjoins the Planck curve 11 at the high-temperature end point Tu. In this case, the composite curve 1 is preferably at least once continuously differentiable at the point Tu. The extended Planck curve 12 extends from the high-temperature end point Tu to the point S at a wavelength of 380 nm. In the present case, the point S is the point of intersection of the spectral color line 2 with the purple line 3.

As described above, conventional methods for binning, for example of light-emitting diodes, only relate to color loci to which a color temperature or, by means of the Judd lines 4, a correlated color temperature can be assigned. Other color loci, such as blue color locus ranges, for example, now become accessible to binning by way of the composite curve 1.

Figure 1B:
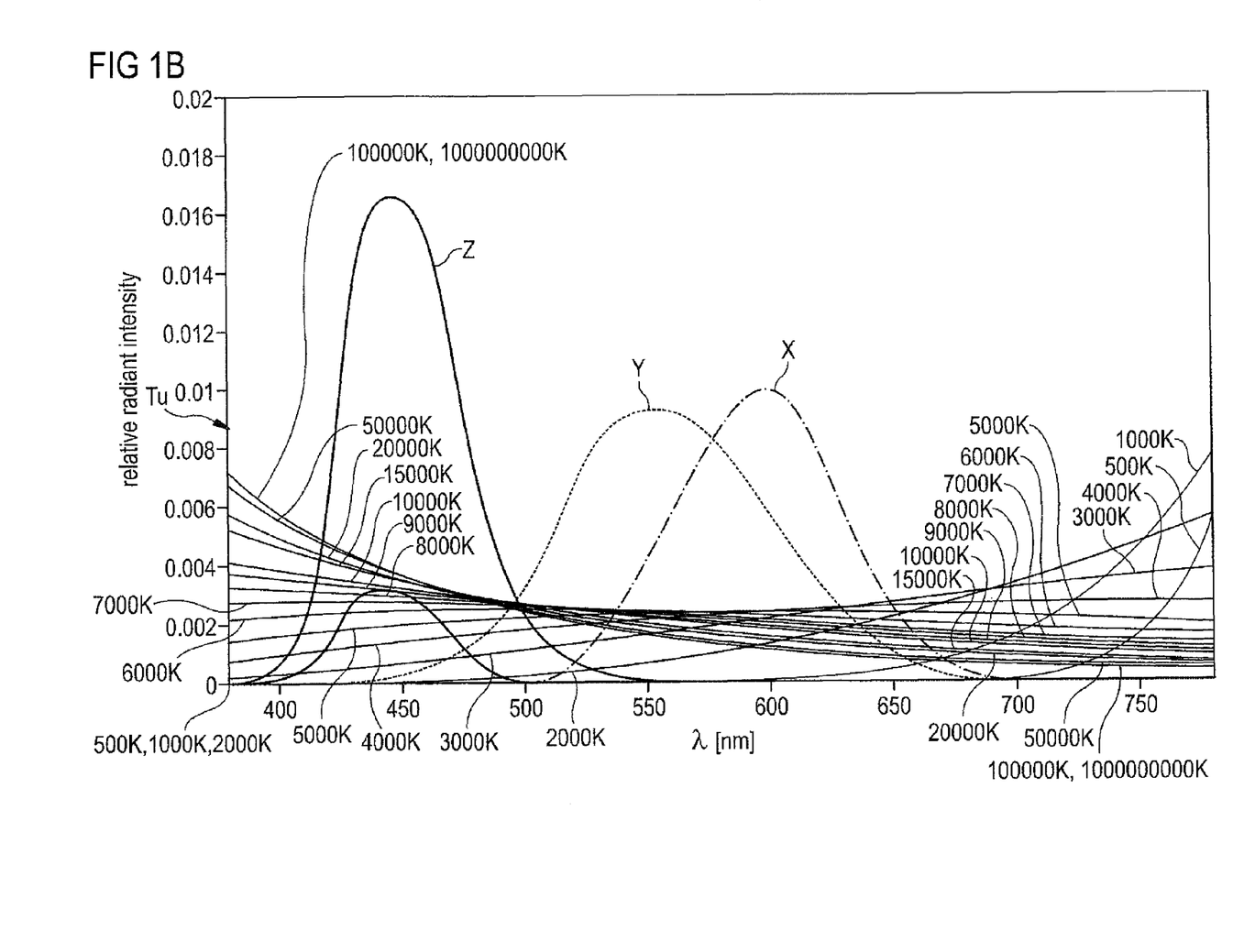
FIG. 1B shows the spectra of black-body radiators for different color temperatures.

The spectra of black-body radiators for different color temperatures are plotted in FIG. 1B. It can be seen in this case that the curves converge for a color temperature toward infinity, that is to say at the point Tu. For a temperature T toward 0, a great exponential rise results and the value of the "color matching functions" X, Y, Z tends toward 0 for wavelengths of >800 nm.

In the present case, the high-temperature end point Tu is chosen as the starting point for establishing a curvilinear coordinate system. The high-temperature end point Tu therefore forms the zero point or origin of the coordinate system. In this case, the high-temperature end point Tu has the advantage that it is independent of weather and through what matter the light passes. In particular, it is the same for the Planck curve in a vacuum and in air.

Figure 2A:
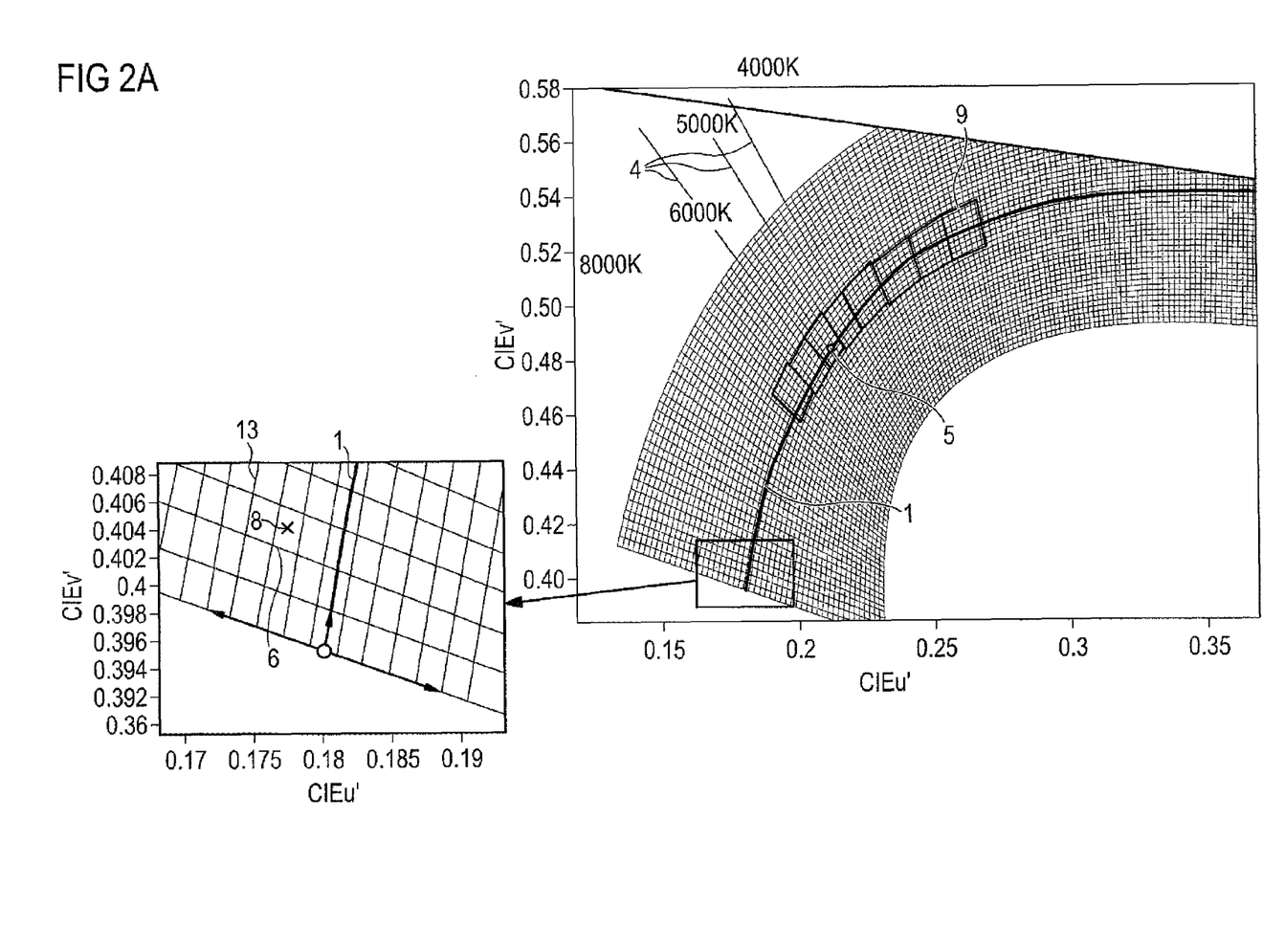
FIG. 2A shows the composite curve 1 of FIG. 1A.

The binning method described here will now be explained in greater detail on the basis of the graphical plotting in FIG. 2A. FIG. 2A shows the composite curve 1. The composite curve 1 and the parallel lines 13 with respect to the composite curve 1 and also the Judd lines 4 span a space that can be parameterized by the two parameters shown, the parameter p, the path length on the composite curve 1, and the parameter j, the path length on a Judd line 4.

In this case, the path lengths p, j are preferably chosen in terms of their magnitude such that a predefined color locus range 6, (that is to say a bin into which the color locus 8 of a radiation-emitting, optoelectronic semiconductor component 20 can be classified) spanned thereby has a size corresponding approximately to a 1-step MacAdam ellipse 5. Fluctuations of the color locus 8 within a predefined color locus range 6 are then imperceptible to the observer.

In the CIE u'v' color space, in which the MacAdam ellipse is approximately a circle, p and j are chosen for example for this as p=0.002 and j=0.002. Transformation of these path lengths into other color spaces is possible.

FIG. 2A also shows the ANSI bins 9. It can be seen that these bins 9 have different sizes and are not centered with respect to the Planck curve 11. Furthermore, binning is possible only in a restricted region of the color space.

Figure 2B:
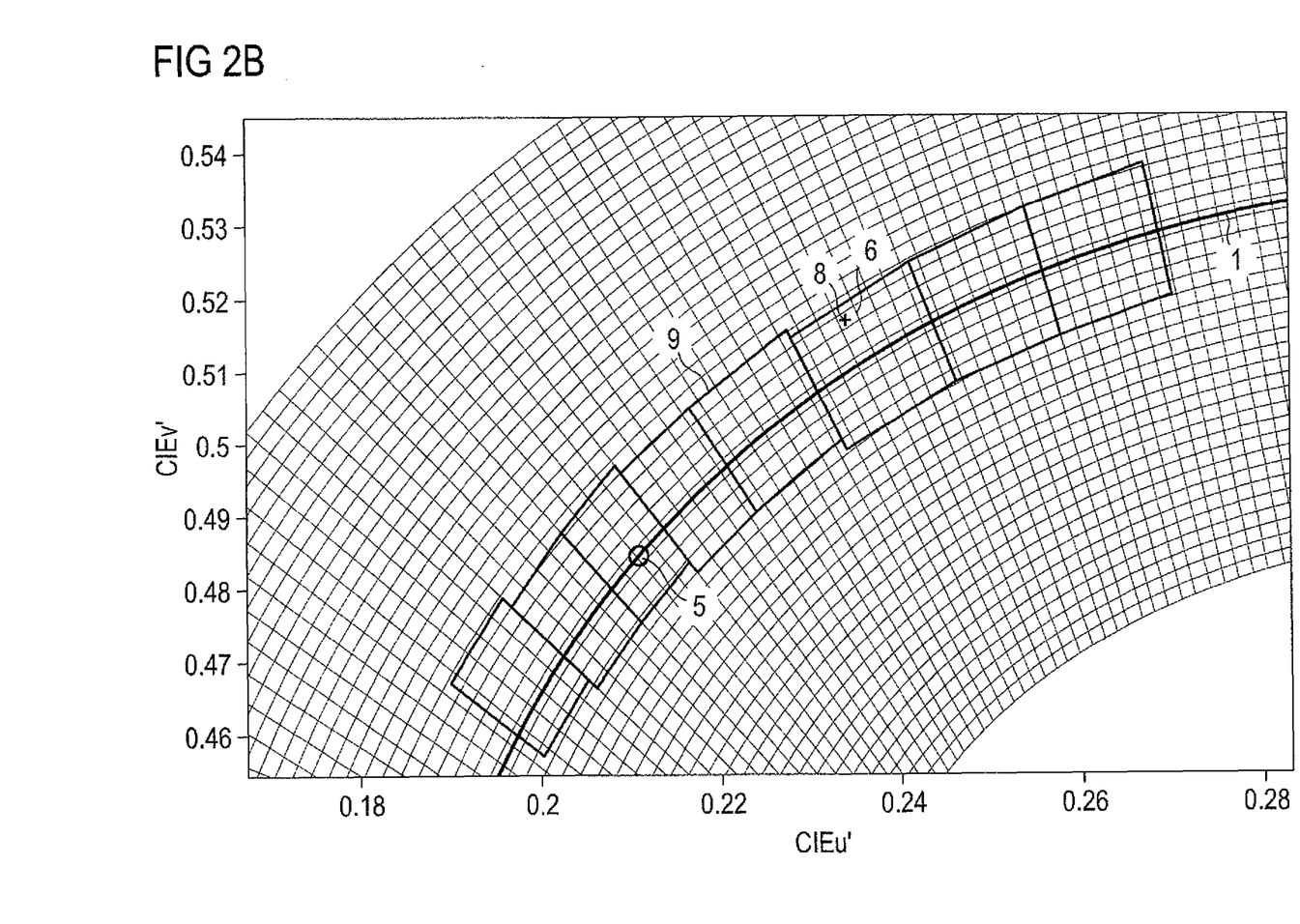
FIG. 2B shows an enlarged excerpt from the CIE u'v' color space with composite curve 1.

FIG. 2B shows an enlarged excerpt from the CIE u'v' color space with composite curve 1.

The construction of the extended Planck curve 12 will be described in greater detail on the basis of the graphical plotting in FIG. 2C. The extended Planck curve 12 is constructed as a Bézier spline by means of the construction points Tu, P, S in the CIE u'v' color space, in the manner as indicated further above in respect of said spline. That is to say that the spline, in the CIE u'v' color space, can be given as follows, for example:

$$\mathrm{spline}(t) = Tu^*(1-t)^2 + P^*t^*(1-t) + S^*t^2,$$

where t being chosen from [0;1];

The first construction point is the high-temperature end point Tu of the Planck curve 11, which has the coordinates u'=0.1801; v'=0.3953 in the CIE u'v' color space.

The second construction point S is in this case the point at which the light on the spectral color line 2 has a wavelength of 380 nm. The point S has the following coordinates: u'=0.2568, v'=0.0165.

In this case, the point of intersection of the spectral color line 2 with the tangent 14 at the high-temperature end point Tu is chosen as the third construction point P. The coordinates of the point P are u'=0.1412, v'=0.1559.

The choice of these construction points is independent of the color space system used and is therefore particularly well suited to the continuation of the Planck curve 11. However, other expedient continuations of the Planck curve are also conceivable. The binning method described here can also be applied to other composite curves.

Figure 2C:
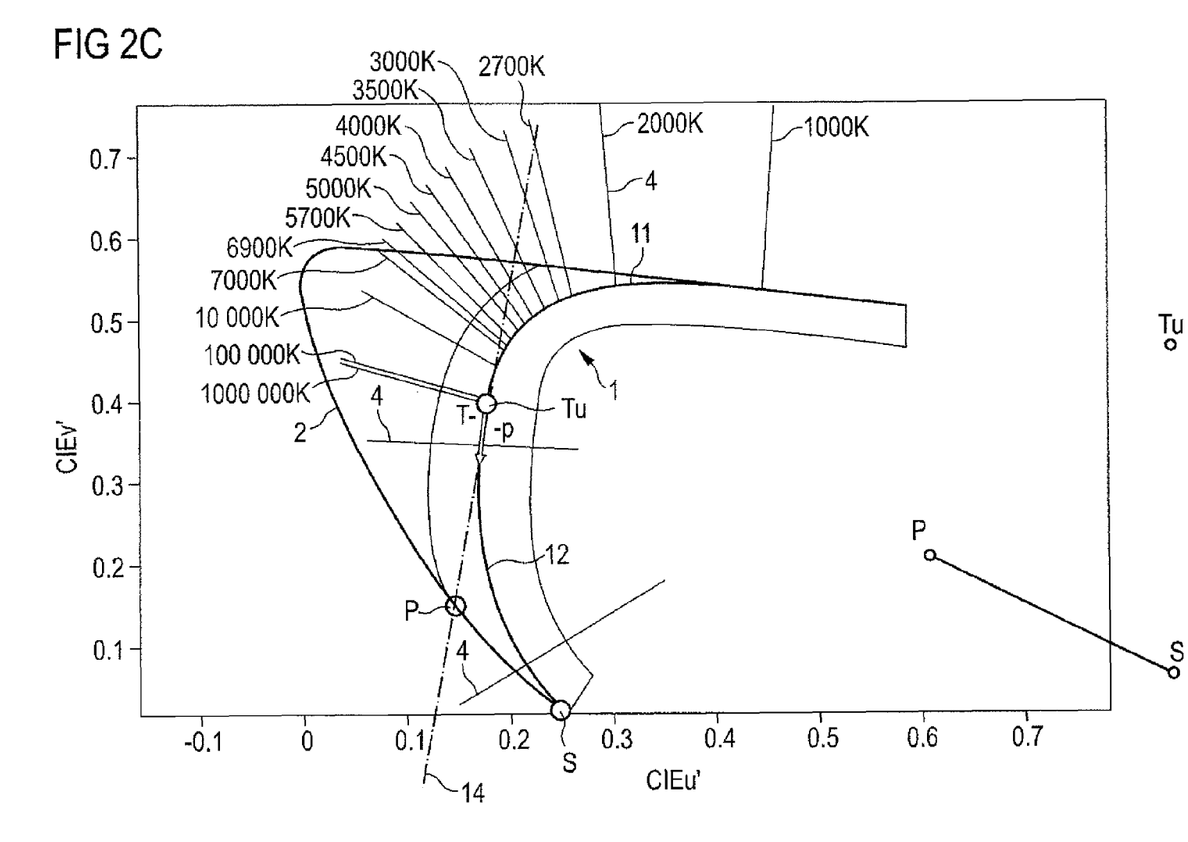
FIG. 2C shows Judd lines 4 of FIG. 1A.

FIG. 2C also depicts Judd lines 4 which, in the CIE (u, v) color space, are perpendicular to the composite curve. This orthogonality is no longer present in the transformed u'-v' color space.

Figure 3:
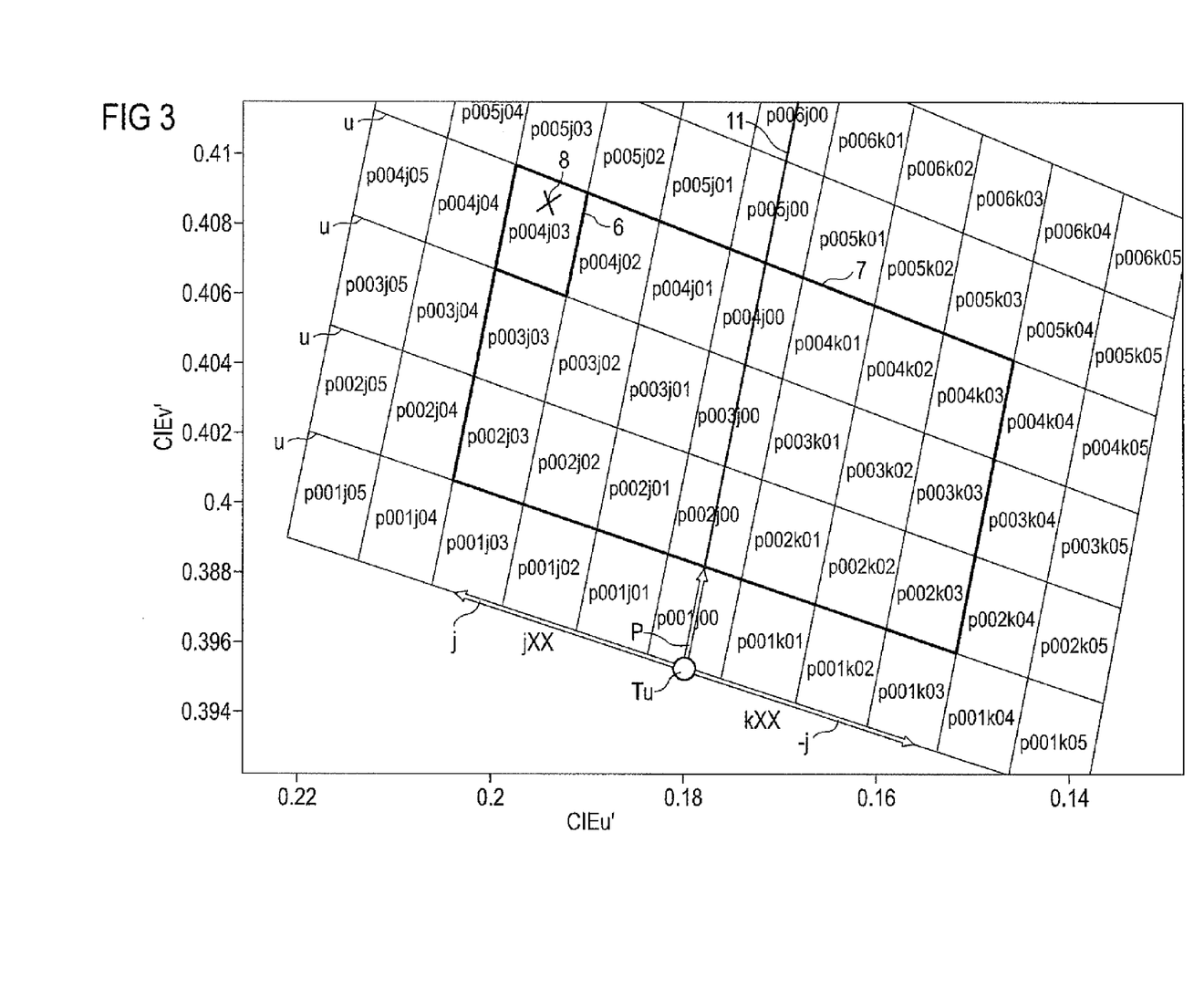
FIG. 3 shows the addressing of a predefined color locus range.

The addressing of a predefined color locus range is explained in greater detail with reference to FIG. 3. As explained above, the address space of the predefined color locus ranges is spanned by the path lengths p and j.

The following nomenclature is chosen in the present case: along the Planck curve 11, the path lengths p away from the high-temperature end point Tu are reckoned as positive and consecutively numbered with pXXX, where X starts at 1.

Along the extended Planck curve 12, the distances are consecutively numbered with nXXX.

Correspondingly, the distances along the Judd lines 4 are consecutively numbered with jXX above the composite curve 1 and kXX below the composite curve 1.

The predefined color locus range 6 plotted, which contains the color locus 8 of the radiation-emitting, semiconductor component, therefore has an address p004j03. The predefined color locus range 6 is situated in a larger group 7 of a plurality of color locus ranges, the address space of which can be specified as follows: p002k03-p004j03.

In other words, the method for the classification of radiation-emitting, optoelectronic semiconductor components as described here makes it possible not only to divide any desired color space into predefined color locus ranges, but also to consistently address each color locus range, that is to say each bin. Consequently, an individual color locus range 6 or a combination of color locus ranges 7 can be specified by means of an unambiguous nomenclature.

FIG. 4 shows, in a schematic plan view, an optoelectronic semiconductor device comprising a module carrier 22. The module carrier 22 is, for example, a circuit board such as a metal-core circuit board or a printed circuit board. A housing 23, for example a ceramic carrier, which carries three radiation-emitting, optoelectronic semiconductor components 20, for example light-emitting diode chips, is applied on the module carrier 22.

The semiconductor components 20 are each classified into a predefined color locus range by means of a method described here. By way of example, the light emitted by the semiconductor components 20 during operation has in each case a color locus that comes under the same bin.

The measured values that have been determined at the semiconductor components 20, that is to say, for example, the addresses of the predefined color locus ranges in which the semiconductor components 20 are classified, are stored in an electronic storage unit 21, which is likewise fixed and electrically connected on the module carrier 22. Contact can be made with the device externally via a connection location 24. The color locus information can also be read out from the storage unit 21 via the connection location 24.

Overall, a particularly flexible method for the binning of radiation-emitting, semiconductor components is specified here. The method can be adapted to different color space systems. Furthermore, the method can be carried out independently of whether the Planck curve is determined in a vacuum or in air. Furthermore, it is possible also to apply this method to other light-generating devices such as fluorescent lamps, discharge lamps or electroluminescent lamps.

The invention is not restricted to the exemplary embodiments by the description on the basis thereof. Rather, the invention encompasses any novel feature and also any combination of features, which in particular includes any combination of features in the patent claims, even if this feature or this combination itself is not explicitly specified in the patent claims or exemplary embodiments.

We claim:

1. A method for the binning of a radiation-emitting, optoelectronic semiconductor component, comprising the steps of:
   providing a radiation-emitting, optoelectronic semiconductor component;
   determining a color locus of a light emitted by the radiation-emitting, optoelectronic semiconductor component during operation; and
   classifying the radiation-emitting, optoelectronic semiconductor component into a predefined color locus range comprising the color locus determined,
   wherein the predefined color locus range is selected from a group of color locus ranges and at least one of the color locus ranges from the group of color locus ranges comprises a blue color locus,
   wherein at least one of the color locus ranges from the group of color locus ranges is intersected by an extended Planck curve or adjoins the extended Planck curve which continues the Planck curve at its high-temperature end point and together with the Planck curve forms a composite curve.

2. The method as claimed in claim 1, wherein the extended Planck curve continues the Planck curve at its high-temperature end point in an at least once continuously differentiable manner.

3. The method as claimed in claim 2, wherein the extended Planck curve, in the CIE u'v' color space, is an at least quadratic spline.

4. The method as claimed in claim 3, wherein the extended Planck curve, in the CIE u'v' color space, is a quadratic Bézier spline.

5. The method as claimed in claim 3, wherein one point for the construction of the spline is the high-temperature end point of the Planck curve.

6. The method as claimed in claim 3, wherein one point for the construction of the spline is a point on the tangent to the Planck curve at the high-temperature end point.

7. The method as claimed in claim 3, wherein one point for the construction of the spline lies on the spectral color line.

8. The method as claimed in claim 1, wherein
each color locus range from the group of color locus ranges is assigned an address,
the address has a first parameter, which indicates the distance of the color locus range along the composite curve from the high-temperature end point of the Planck curve, and
the address has a second parameter which indicates the distance of the color locus range from the composite curve along a Judd line.

9. The method as claimed in claim 1, wherein the size of each color locus range from the group of color locus ranges is chosen in such a way that an observer perceives no difference for colors from the same color locus range.

10. The method as claimed in claim 1, wherein the size of each color locus range from the group of color locus ranges corresponds at most to a three-step MacAdam ellipse.

11. The method as claimed in claim 1, wherein the size of each color locus range from the group of color locus ranges corresponds approximately identically or identically to a 1-step MacAdam ellipse.

12. The method as claimed in claim 8, wherein the extent of each color locus range from the group of color locus ranges measured along the composite curve is at least 0.001 and at most 0.005 in the CIE u'v' color space.

13. The method as claimed in claim 8, wherein the extent of each color locus range from the group of color locus ranges measured along a Judd line is at least 0.001 and at most 0.005 in the CIE u'v' color space.

14. The method as claimed in claim 1, wherein measured values with respect to the predefined color locus range are stored in a storage unit, which is fixed and electrically connected on a module carrier for the radiation-emitting, optoelectronic semiconductor component.

15. A method for the binning of a radiation-emitting, optoelectronic semiconductor component, comprising the steps of:
providing a radiation-emitting, optoelectronic semiconductor component;
determining a color locus of a light emitted by the radiation-emitting, optoelectronic semiconductor component during operation; and
classifying the radiation-emitting, optoelectronic semiconductor component into a predefined color locus range comprising the color locus determined,
wherein the predefined color locus range is selected from a group of color locus ranges and at least one of the color locus ranges from the group of color locus ranges comprises a color locus to which no correlated color temperature can be assigned,
wherein at least one of the color locus ranges from the group of color locus ranges is intersected by an extended Planck curve or adjoins the extended Planck curve which continues the Planck curve at its high-temperature end point and together with the Planck curve forms a composite curve, and
wherein the extended Planck curve continues the Planck curve at its high-temperature end point in an at least once continuously differentiable manner.

16. The method as claimed in claim 15, wherein the extended Planck curve, in the CIE u'v' color space, is a quadratic Bézier spline.

17. The method as claimed in claim 15,
wherein each color locus range from the group of color locus ranges is assigned an address,
wherein the address has a first parameter, which indicates the distance of the color locus range along the composite curve from the high-temperature end point of the Planck curve, and
wherein the address has a second parameter which indicates the distance of the color locus range from the composite curve along a Judd line.

* * * * *